(12) United States Patent
Dvorak et al.

(10) Patent No.: US 7,098,786 B2
(45) Date of Patent: Aug. 29, 2006

(54) MECHANISM FOR PROVIDING AUTOMATIC ITEM COUPLING WITH THE COUPLING RANGE DETERMINED BY CONTEXT INFORMATION

(75) Inventors: Joseph L. Dvorak, Boca Raton, FL (US); Alan R. Beatty, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 46 days.

(21) Appl. No.: 10/885,169

(22) Filed: Jul. 2, 2004

(65) Prior Publication Data

US 2006/0001527 A1    Jan. 5, 2006

(51) Int. Cl.
*G08B 1/08*    (2006.01)
(52) U.S. Cl. .............................. 340/539.15; 340/539.1; 340/539.11; 340/539.13; 340/539.23; 340/568.1; 340/573.1
(58) Field of Classification Search ........... 340/539.15, 340/539.1, 539.11, 539.13, 539.21, 539.23, 340/539.32, 568.1, 572.1, 573.1
See application file for complete search history.

(56) References Cited

U.S. PATENT DOCUMENTS

| | | | | |
|---|---|---|---|---|
| 5,402,104 A | * | 3/1995 | LaRosa | 340/539.23 |
| 5,650,770 A | * | 7/1997 | Schlager et al. | 340/573.1 |
| 5,748,087 A | * | 5/1998 | Ingargiola et al. | 340/573.7 |
| 6,002,334 A | * | 12/1999 | Dvorak | 340/568.1 |
| 6,326,891 B1 | * | 12/2001 | Lin | 340/573.4 |
| 6,331,817 B1 | | 12/2001 | Goldberg | |
| 6,459,894 B1 | | 10/2002 | Phillips et al. | |
| 6,574,511 B1 | | 6/2003 | Lee | |
| 6,756,901 B1 | * | 6/2004 | Campman | 340/573.1 |
| 6,847,295 B1 | * | 1/2005 | Taliaferro et al. | 340/539.13 |
| 2001/0049544 A1 | | 12/2001 | Lee | |

OTHER PUBLICATIONS

National Scientific Corporation, "Frequently Asked Questions for GOTCHA!™", http://www.nsclocators.com/products/FAQs_gotcha.htm.

* cited by examiner

*Primary Examiner*—Daryl C. Pope

(57) ABSTRACT

A system (100) includes a wireless device (101) and at least one transponder (102). The wireless device (101) includes a memory (201) with an area (202) for storing coupling range profiles, a processor (203), a bus (210), a receiver (206), a transmitter (205), an alarm (208), a location module (209), a user interface (211), an antenna (212) for receiving transmitted location information, a power controller (204), an antenna (207) for transmitting and receiving, and a clock (213). The transponder includes a memory (301) with an area (302) for storing a unique transponder ID, a processor (303), a bus (308), power controller (304), a receiver (306), transmitter (305), and an antenna (307). The wireless device (101) compares current context information to a coupling range profile and, based on the results of the comparison, transmits to at least one transponder (102) at an appropriate power level. If the transponder (102) is within the predetermined range, it will transmit and the wireless device (101) will receive a response signal. If the current location context changes, the wireless device (101) will automatically affect a change in coupling distance to the transponder (102).

41 Claims, 5 Drawing Sheets

MECHANISM FOR PROVIDING AUTOMATIC ITEM COUPLING WITH THE COUPLING RANGE DETERMINED BY CONTEXT INFORMATION

BACKGROUND OF THE INVENTION

1. Field of the Invention

The present invention relates generally to the field of wireless devices, and more particularly relates to item location tracking using a wireless device.

2. Background of the Invention

Remaining in close proximity to moving items, such as children, is desirable for many reasons and in many situations. The definition of close proximity, however, varies with the particular surroundings. For instance, if a mother and her child are in the children's section at the local library, the distance a child can comfortably wander off is much greater than if the same mother and child are at a busy shopping mall. Also, the time of day might factor into how far a child can safely wander; a child playing in a park during the day is able to wander further than the same child in the same park at dusk.

Children aren't the only items that need to be tracked; pets, for instance, need to be monitored so they won't stray. Even adults often need to ensure that they stay in close proximity to another adult. For instance, adults hiking in the woods, riding bicycles, shopping in a mall, or any of a multitude of other situations, require attention to proximity of the other person. The maximum comfortable distance between adults, however, will most likely be much greater than that of an adult and child or adult and pet.

Additionally, people often have sets of objects that they need to have with them at different times during the day, such as keys, briefcases, PDAs, laptops, palmtops, messaging devices, and more. These items need to be monitored so as not to be unintentionally left behind. For example, when a person leaves home to go to work in the morning, the person may need keys to the house, keys to the office, keys to the car, a wallet or purse, and a variety of other items.

Further, some of these objects may be valuable. For example, a person may desire to take a laptop computer or a personal digital assistant (PDA) to work, to a library, or to some other location where the device might be put to use. In those locations, however, the person may leave the object for a few moments, for example, to look in the library stacks, leaving the object unguarded and vulnerable to being stolen. Clearly a need exists for tracking an item.

One solution to this problem is to attach a tracker tag to the item needing to be monitored and using a tracker to monitor the item. In this way, the item is coupled to the tracking unit. When the item travels beyond a specific distance, the tracker sounds an alert to notify the wearer that the item has traveled beyond a specified maximum distance.

The solution suffers from the disadvantage, however, that the range is static. Once the range is set as the desired distance, the range remains at that distance without regard to time, location, or any other factor. As discussed in the preceding paragraphs, the desired range for tracking an item varies with time, location, and other possible factors.

Accordingly, a need exists for a tracking system that provides automatic item coupling with the coupling range determined by context of the situation.

SUMMARY OF THE INVENTION

Briefly, in accordance with the present invention, disclosed is a system for tracking at least one item. The system includes a device, which can be a dedicated tracking device or a multi-functional device such as a wireless telephone that determines its current location using any suitable mechanism, such as a location beacon, global positioning satellite, user input, and more. The device communicates to a transponder, which is attached to the item to be tracked. The device is programmed with at least one coupling range profile that includes, but is not limited to information such as the name of the transponder or transponders to be coupled to the device, the current geographic location of the device, time intervals for transmitting to the transponder, time intervals for the transponder to transmit back to the device, the name of the device itself, and the maximum allowable range between the device and the transponder. A user interface can be provided on the device to allow a user to input the coupling range profile and/or a receiver can be utilized to receive transmitted coupling range profile information from a source.

Each device and each transponder is equipped with a transmitter and receiver. Once the device obtains information pertaining to the circumstances of the current environment, such as time, date, location, etc., a software program inside the device accesses each coupling range profile, scans the fields of each profile, and determines the appropriate range of coupling for the situation defined by the profile and the location information, it transmits the coupling range information to each transponder.

The transponders can be equipped with a mechanism that adjusts the requested coupling range. In one embodiment, the coupling range is modified by adjusting overall signal power. However, in other embodiments other methods are used, such as adjusting coding gain, or increasing energy per pulse. Other alternative methods or techniques known in the art, such as adjusting receiver gain, have also been shown to be used advantageously with the present invention.

If the wireless device does not receive a reply signal from the transponder, the device activates a notification or alarm mechanism to alert the user that the range has been exceeded. To avoid false alarms, a delay can be built into the system so that a predefined time period to receive the expected reply from the transponder is missed before the alarm is activated.

Accordingly, the system includes first, at least one transponder including a unique identifier, a receiver for receiving at least a portion of a coupling range profile, and a transmitter for transmitting the unique identifier; and second, a wireless device including a location module for receiving location information and determining a location of the device, at least one coupling range profile, a transmitter for transmitting at least a portion of each coupling range profile, a receiver for receiving a reply from each transponder, and a comparator for determining whether each transponder is within a range.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE EMBODIMENT(S)

Figure 1:
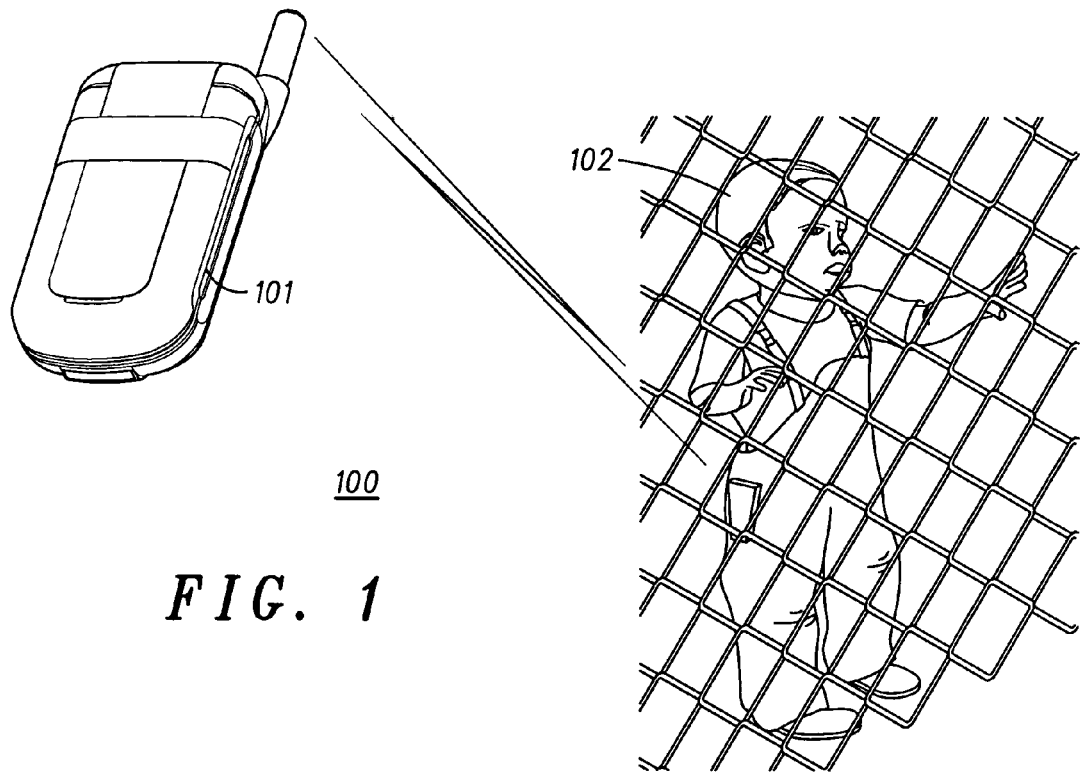
FIG. 1 is an overall system diagram illustrating one embodiment of a wireless device and a transponder.

While the specification concludes with claims defining the features of the invention that are regarded as novel, it is believed that the invention will be better understood from a consideration of the following description in conjunction with the drawing figures, in which like reference numerals are carried forward.

Figure 2:
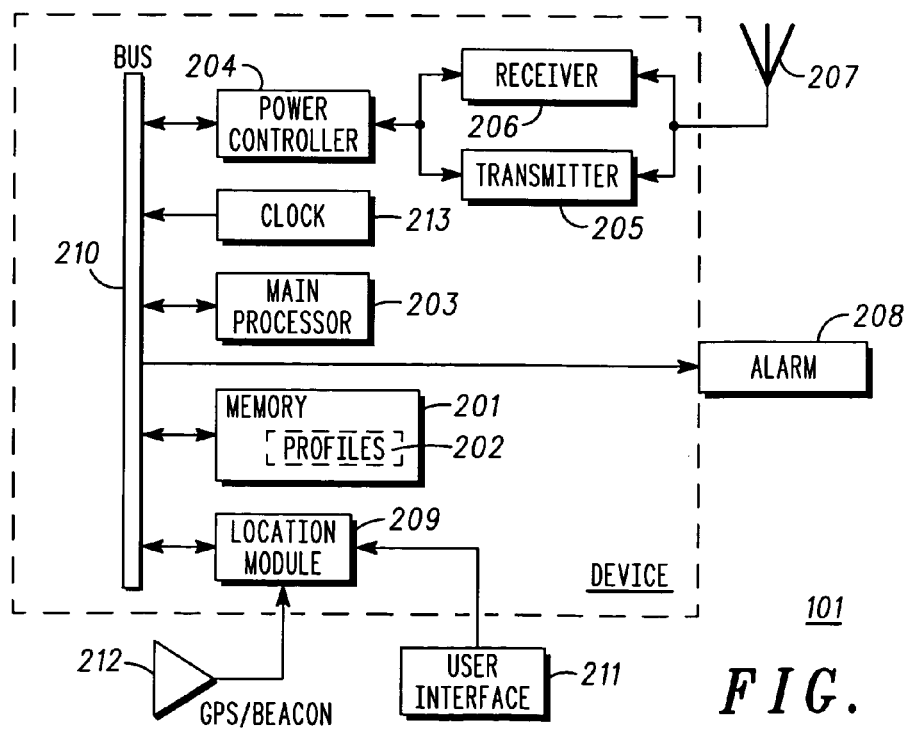
FIG. 2 is a hardware block diagram illustrating one embodiment of a wireless device.

Described now is an exemplary hardware platform according to an exemplary embodiment of the present invention. Referring to FIG. 1, an overall system 100 is shown. The system 100 includes a wireless device 101 capable of transmitting and receiving wirelessly, in a manner well known to those of ordinary skill in the art, including a cellular telephone, radio, PDA, computer, electronic organizer, other messaging devices, and an electronic timepiece. The wireless device 101 is shown as a cellular telephone in the drawing. The major hardware components of wireless device 101 is shown in detail in FIG. 2 and includes a memory 201 with an area 202 for storing coupling range profiles, a bus 203, a processor 203, a receiver 206, a transmitter 205, an alarm 208, a location module 209, a user interface 211, an antenna 212 for receiving transmitted location information, a power controller 204, a clock 213, and an antenna 207 for transmitting and receiving wireless telephone voice and message signals.

Also shown in FIG. 1 is a transponder 102. Like the wireless device 101, the transponder 102 is capable of transmitting and receiving wirelessly, in a manner well known to those of ordinary skill in the art. The particular transponder embodiment shown in FIG. 1 is a tag that can be clipped onto the item to be tracked, such as a baby's clothes.

Figure 3:
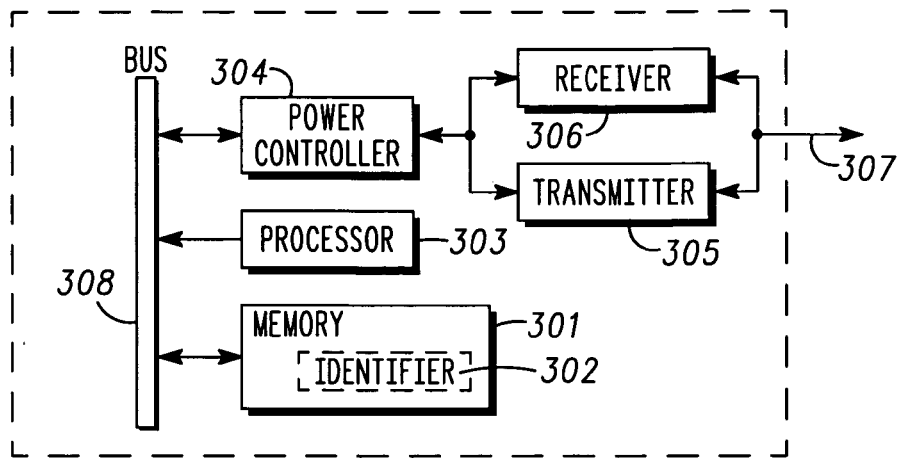
FIG. 3 is a hardware block diagram illustrating one embodiment of a transponder.

One hardware embodiment of the transponder is shown in detail in FIG. 3 and includes a memory 301 with an area 302 for storing a unique transponder ID, a processor 303, a bus 308, power controller 304, a receiver 306, transmitter 305, and an antenna 307.

Figure 4:
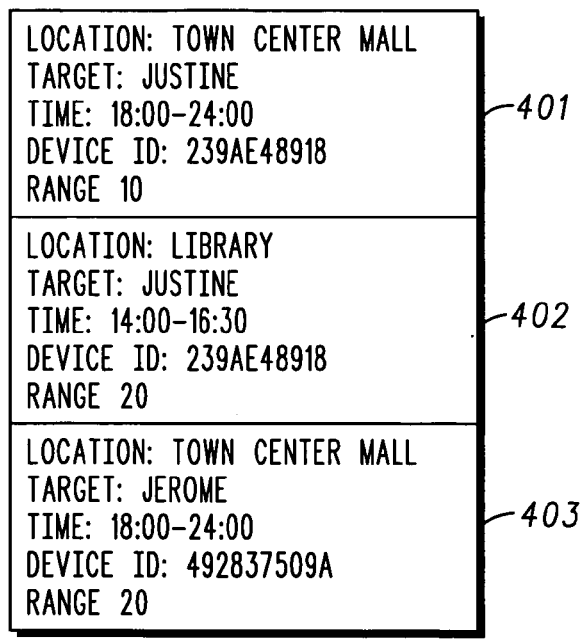
FIG. 4 is a diagram of three specific examples of coupling range profiles.

Referring now to FIG. 4, three coupling range profiles 401, 402, 403 are shown. Each profile 401, 402, 403 contains a number of fields, or information areas. A particular profile can have any number of fields, depending on the objectives of the profile use and the amount of information necessary. As will be discussed in detail, one of the inventive features of the present invention is that a coupling range is automatically altered based on the particular context of the environment of the device. In the first coupling range profile 401, the fields are location, target, time, device, and range. The information corresponding to these fields in the coupling range profile might indicate that a person named "Justine" will be wearing a transponder with a unique device ID of "239AE48918" and should be tracked to stay within "10" units (which could set to indicate feet, yards, miles, and more) at the "Town Center Mall" if the time is between "18:00–24:00" hours.

Looking to a second coupling range profile 402, it can be seen that the information contained in the same fields as in the first coupling range profile 401 indicates that the same person, "Justine", wearing the same transponder ("239AE48918"), can be tracked to remain at a greater distance away, "20" units, if at the "Library" and the time is between "14:00–16:30" hours. Logically speaking, the Library has less traffic and would seem to be a safer environment, thereby justifying the larger tracking distance. Additionally, the time of day in profile 402 is earlier than in the first profile 401. This adds an additional element of safety to the context and would also justify a larger coupling distance.

Finally, looking to the third coupling range profile 403, a person named "Jerome" carrying a transponder with unique device ID "492837509" can safely wander up to "20" units from the wireless device in the "Town Center Mall" before the range has been exceeded. It is thus shown that the distance an item or person should be tracked can vary depending on location, time, and which item or person is being tracked.

At least one coupling range profile is typically entered into the wireless device 101 before a tracking function can begin. In another embodiment, a default profile is previously stored in device 101. Additionally, the information contained in the coupling range profiles shown in FIG. 4 is compared to the "context" of the actual tracking situation to determine whether the parameters have been exceeded.

Figure 5:
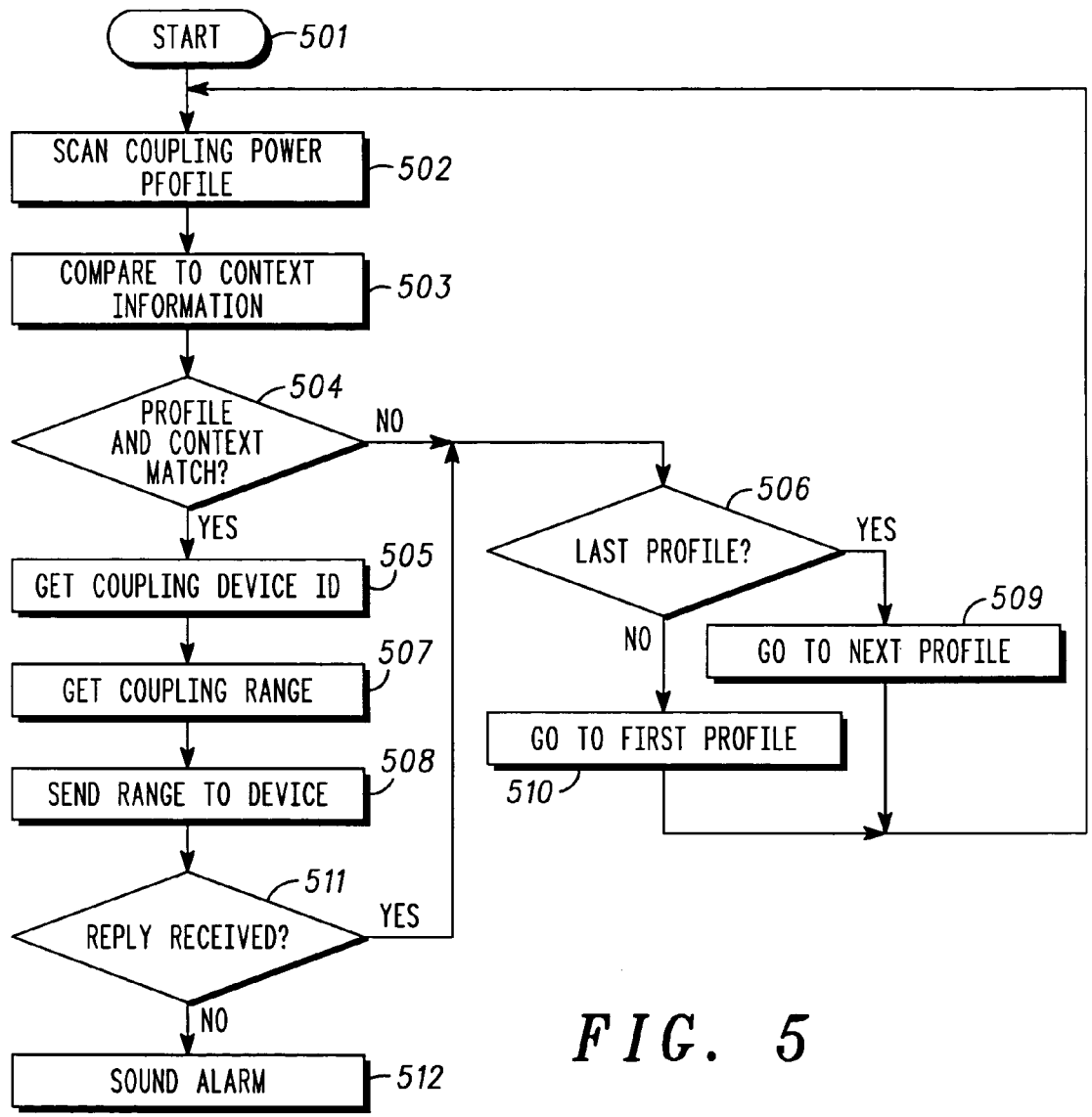
FIG. 5 is a flow diagram of a wireless device algorithm for processing and transmitting coupling range information.
Figure 6:
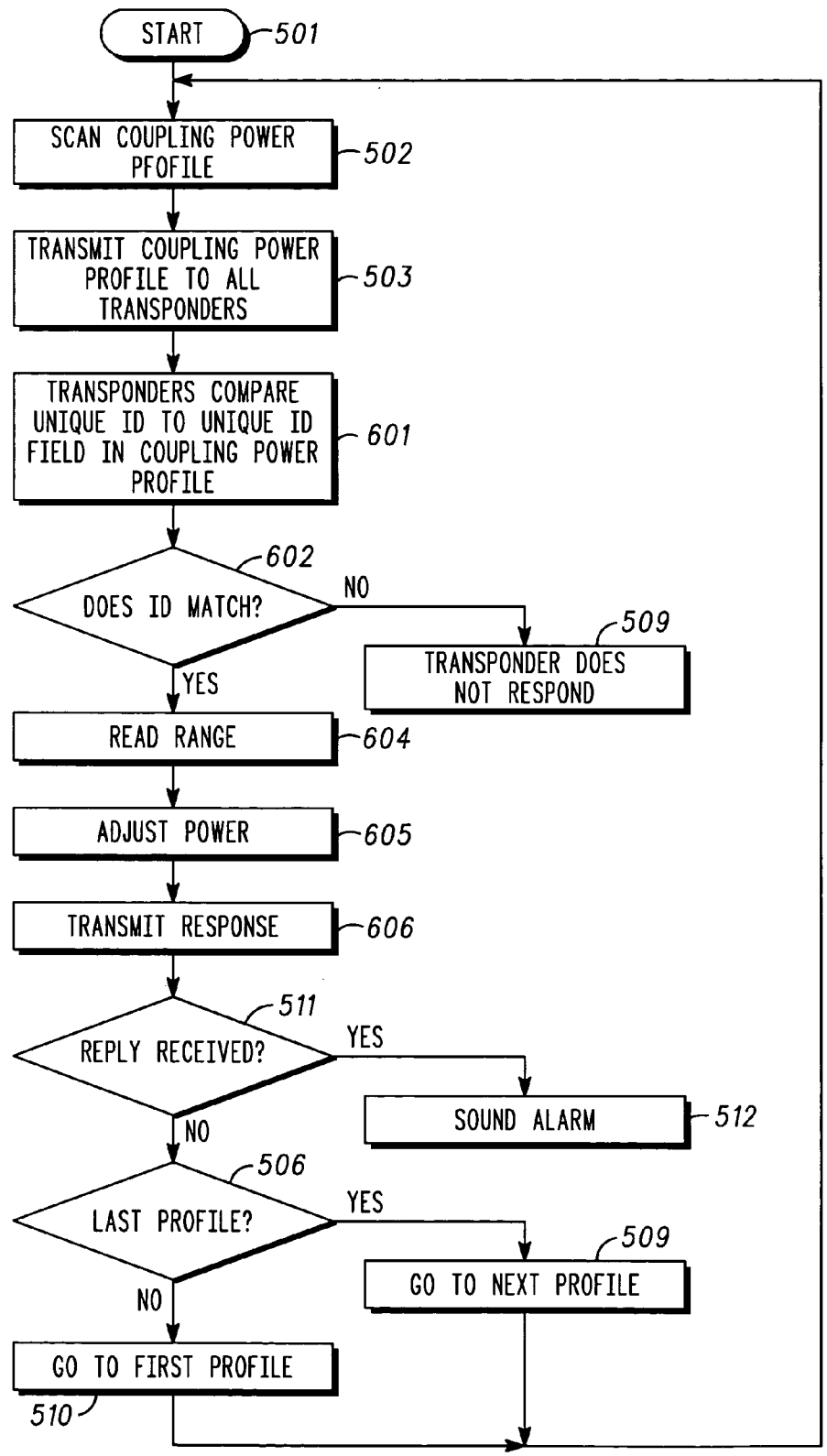
FIG. 6 is a flow diagram of an algorithm for a system providing automatic item coupling with the coupling range determined by context information.

Referring now to FIG. 5, a flow diagram for providing automatic item coupling between a wireless device 101 and a smart transponder 102, with the coupling range determined by context information, is shown. The algorithm shown in FIG. 5 is processed in the wireless device 101, shown in detail in FIG. 2, and does not show the steps performed by the transponder 102, shown in detail in FIG. 3. The steps performed by transponder 102 are shown in FIG. 6.

Looking first to FIG. 5, the process begins at block 501. As explained in the preceding paragraph, a coupling range profile 401 has been programmed into the wireless device prior to the first step 501. At step 502, a software program in conjunction with a processor 203 accesses a first coupling range profile 401 and scans the elements of the profile 401. Once scanned, in step 503, the processor 203 compares profile 401 to actual context information, which includes the time of day and the current location of the device and transponder.

The wireless device 101 can receive location information in a variety of ways, such as user input, GPS transmission, location beacon, and more. The wireless device 101 is provided with an input for receiving the location information. In one embodiment, the device has two input types, a user interface 211 for manually inputting data and an antenna 212 for receiving transmitted location information. The wireless device 101 can also have an internal clock 213 to compare against the time field in the coupling range profiles. At decision block 504, if the profile 401 and the context match, for instance, if the wireless device is at the Town Center Mall at 20:00 hours, the process moves on to step 505 and accesses the unique transponder ID number contained in the profile 401. If the profile 401 and context do not match, the process moves on to step 406 and checks for additional stored profiles. For clarity of discussion, we will leave step 506 for now and returning to step 505, where the unique transponder ID is read from the profile 401. The process then moves to step 507, where the coupling range is read from the profile. The coupling range is the maximum distance that the transponder and wireless device can be separated before an alarm 208 will be triggered.

In step 508, a signal containing at least the transponder ID is sent via transmitter 205 from the wireless device 101 to at least one transponder 102. The power level of this signal can be dictated by the magnitude of the range value in the coupling profile. Alternatively, the transponder 102 can be provided with a transmitter power controller 304 that adjusts the range of the response signal. After the signal has been transmitted, the wireless device 101 will open a receiving channel 207 for receiving a reply signal from at least one of the transponders 102. Depending on the particular embodiment in use, the wireless device 101 may check for a response from all transponders 102 known to be in use at a particular time, a specifically queried transponder 102, or a specifically queried subset of all transponders 102 in use at a particular time. This step is shown in block 511.

The coupling range profile may define the amount of time that the wireless device 101 will wait for the reply signal and which transponders to wait for. If a reply signal is not received within the expected time frame, wireless device 101 will sound alarm 208, show in block 512. If a reply signal is received from the proper transponder, the process moves to step 506, referred to above, which interrogates the stored profiles 401, 402, 403 to see if the current profile is the last profile. If there is at least one additional profile that has not been read, the process moves to step 509 and loads that profile and continues back to step 501. As an illustrative example, if the current profile is the first profile 401, shown in FIG. 1, the wireless devices would look to see if there is an additional profile that has not been read. Since the second profile 402 follows the first profile 401, step 509 would be to load the second profile 402. If the current profile is the last profile, the process moves to step 210, which again loads the first profile. Continuing the example, the current profile is the third profile 403 and the last profile in this example shown in FIG. 4. The process moves back to the first profile 401 and begins again at step 501.

Referring now to FIG. 6, the system process is shown in flow diagram form. Many of the steps in FIG. 6 are the same as those in FIG. 5 and like reference numerals refer to identical or functionally similar steps. However, in FIG. 6, the transponder algorithm for a "smart" transponder is also included. Moving to step 601, which follows steps 501–505, 507, and 508, explained above, once each transponder 102 receives the signal, through its receiver 306, transmitted from the wireless device 101, each transponder compares its unique transponder ID 302 with the unique transponder ID sent by the wireless device. If the IDs do not match 602, the transponder 102 does not respond 603. If the IDs do match 602, the range value is read from the received signal in 604, the transmit power level is adjusted accordingly in step 605, and a response signal containing the unique transponder ID 302 is transmitted in step 606. The wireless device 101, in step 511, then checks to see if the ID 302 was transmitted in response to the coupling range profile transmitted in step 508. If the answer is no, the wireless device sounds alarm 208, in step 512. If the answer is yes, the process moves to step 506 and proceeds as described above for the wireless device 101 algorithm in FIG. 5.

In an alternate embodiment to that described above, the transponders 102 can be "dummy" transponders. In this embodiment, the transponder 102 does not compare its ID 302 to that in a coupling profile transmitted by the wireless device and/or the transponder 102 does not have means for adjusting its response power. The transponders can simply respond with their ID 302 to every interrogation by the wireless device 101. Accordingly, dummy transponders do not need to be provided with a memory 301, a processor 303 or a bus 308.

Figure 7:
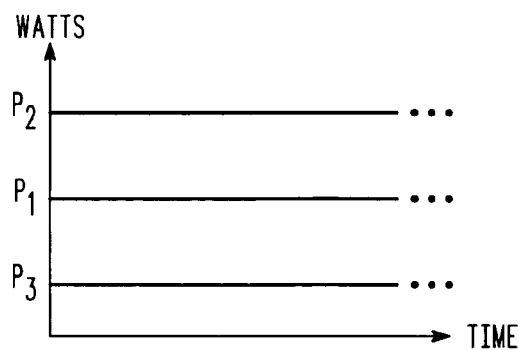
FIG. 7 is first signal diagram of one method of transmitting a signal at varying power levels.
Figure 8:
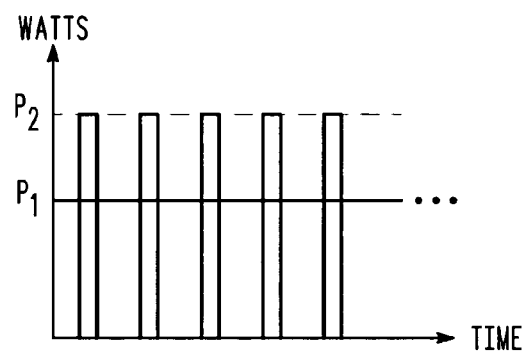
FIGS. 8 and 9 are a series of signal diagrams of a second method of transmitting a signal at varying power levels.
Figure 9:
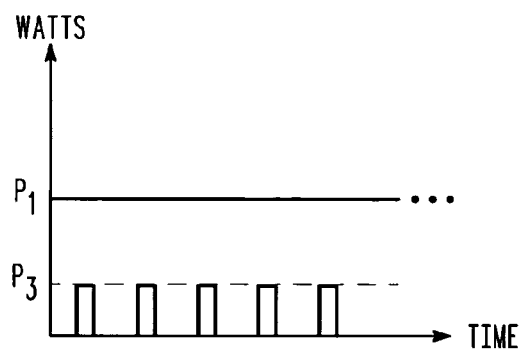

Referring now to FIGS. 7, 8 and 9, shown are various methods of affecting a change in range by adjusting signal power, is shown. In FIG. 7, three power levels $P_1$, $P_2$, and $P_3$ are shown. $P_1$ is a default power level and the graph represents total power (w) over time (t). One way to adjust transmit power is to boost or lower the total power of the signal. A boosted signal $P_2$ and a signal with reduced power $P_3$ are shown in FIG. 7. However, because transmission pulses are sent only at discrete times, it is inefficient to continuously boost an entire signal in this manner. Alternatively, as shown in FIGS. 8 and 9, only the energy for each pulse is adjusted. This method provides greater efficiency. Yet a third embodiment is to adjust the gain of the receiver.

Figure 10:
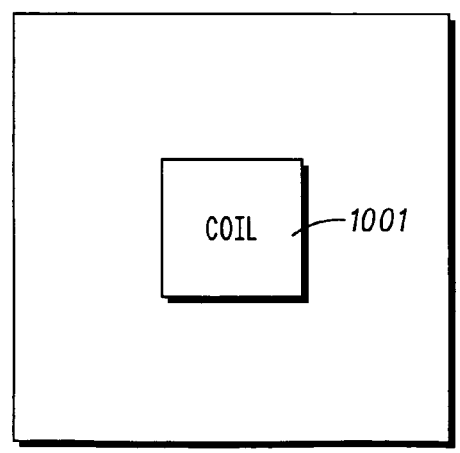
FIG. 10 is a block diagram illustrating a second embodiment of a transponder.

FIG. 10 shows a second embodiment 800 of the transponder 102, which differs from the "smart" or "microprocessor-based" transponder shown mechanically in FIG. 3 and shown functionally in FIG. 6. In the embodiment of FIG. 10, the transponder 102 is provided with only a coil 801. When the transmitter 205 of the wireless device 101 transmits to the transponder 102, an inductance is created in the coil 801. If the inductive response is received and interpreted by the wireless device 101, it is known that the transponder is within the predetermined range. The transponder 800 of FIG. 8 can also return a response containing a particular ID signal in response to the transmission of the wireless device 101, which indicates to the wireless device 101 that that particular transponder is within a predetermined range.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wireless system for tracking objects, the system comprising:
   at least one wireless device including:
   at least one coupling range profile defining a context and a coupling range based on the context;
   a transmitter for transmitting at least a portion of each coupling range profile at a power level that is set based upon the coupling range;
   a receiver;
   a comparator for determining whether one or more transponders are within a predetermined coupling range profile; and
   at least one of the one or more transponders including:
   a unique identifier; and
   a transmitter for transmitting the unique identifier in response to receiving at least a portion of the coupling range profile from the wireless device.

2. The system according to claim 1, wherein the wireless device further comprises:

at least one location module for determining a geographic location of the wireless device.

3. The system according to claim 2, wherein the location module further comprises:
at least one of a satellite global positioning module and a beacon module.

4. The system according to claim 2, wherein the coupling range profile changes based on the geographic location of the wireless device.

5. The system according to claim 2, wherein at least one of the power level of the transmitter of the wireless device and a power level of the transmitter of the transponder is set by adjusting a total output power.

6. The system according to claim 5, wherein the coupling range profile changes based on the geographic location of the transponder.

7. The system according to claim 1, wherein the transponder further comprises:
a transmitter power controller for setting a transmission power of the unique identifier as a function of the geographic location of the wireless device.

8. The system according to claim 1, further comprising a mechanical coupling clip to securely fasten the transponder to an object.

9. The system according to claim 1, wherein the wireless device is at least one of a mobile telephone, a mobile pager, a messaging device, a mobile communication system, and a PDA.

10. The system according to claim 1, wherein the wireless device further comprises:
an alarm for indicating that at least one transponder is not within the coupling range profile.

11. The system according to claim 10, wherein the alarm includes at least one of an audible alert, a vibration, and a light.

12. The system according to claim 1, wherein the transponder further comprises:
a transponder alarm for indicating that the transponder is not within the coupling range profile.

13. The system according to claim 12, wherein the transponder alarm includes at least one of an audible alert, a vibration, and a light.

14. The system according to claim 1, wherein the transponder further comprises:
at least one of a satellite global positioning module and a beacon module for determining a geographic location of the transponder device.

15. The system according to claim 1, wherein the wireless device further comprises:
a user interface for a user to enter location information.

16. The system according to claim 1, wherein the wireless device further comprises:
a user interface for a user to enter the coupling range profile.

17. The system according to claim 1, wherein the coupling range profile includes at least one or more of:
an identifier of a wireless device;
an identifier of a person wearing the device;
an identifier of at least one transponder;
a time interval for an expected response from a transponder;
a distance range; and
an identifier of an item the transponder is mechanically attached to.

18. The system according to claim 1, wherein at least one of the power level of the transmitter of the wireless device and a power level of the transmitter of the transponder is set by adjusting an energy per pulse of an output signal.

19. The system according to claim 1, wherein the receiver in the wireless device further comprises:
a variable gain control which is adjusted based upon information contained in the coupling range profile.

20. A wireless device comprising:
at least one coupling range profile defining a context and a coupling range based on the context;
a transmitter for transmitting at least a portion of each coupling range profile to at least one transponder at a power level that is set based upon the coupling range;
a receiver; and
a comparator for determining whether each transponder is within a predetermined coupling range profile.

21. The wireless device according to claim 20, wherein the wireless device further comprises:
at least one location module for determining a geographic a location of the wireless device.

22. The wireless device according to claim 21, wherein the location module further comprises:
at least one of a satellite global positioning module and a beacon module.

23. The wireless device according to claim 21, wherein the coupling range profile changes based on the geographic location of the wireless device.

24. The wireless device according to claim 21, wherein the coupling range profile changes based on the geographic location of the transponder.

25. The wireless device according to claim 20, wherein the wireless device is at least one of a mobile telephone, a mobile pager, a messaging device, a mobile communication system, and a PDA.

26. The wireless device according to claim 20, wherein the wireless device further comprises:
an alarm for indicating that each transponder is not within the coupling range profile.

27. The wireless device according to claim 26, wherein the alarm includes at least one of an audible alert, a vibration, and a light.

28. The wireless device according to claim 20, wherein the wireless device further comprises:
a user interface for a user to enter input location information.

29. The wireless device according to claim 20, wherein the wireless device further comprises:
a user interface for a user to enter the coupling range profile.

30. The wireless device according to claim 20, wherein the coupling range profile includes one or more of:
an identifier of the wireless device;
an identifier of a person wearing the device;
an identifier of at least one transponder;
a time interval for an expected response from a transponder;
a distance range; and
an identifier of an item the transponder is mechanically attached to.

31. The wireless device according to claim 20. wherein at least one of a power level of the transmitter of the wireless device and the transmitter of the transponder is set by adjusting a total output power.

32. The wireless device according to claim 20, wherein at least one of a power level of the transmitter of the wireless device and the transmitter of the transponder is set by the adjusting an energy per pulse of the an output signal.

33. The wireless device according to claim 20, wherein the receiver in the wireless device further comprises:
   a variable gain control which is adjusted based upon information contained in the coupling range profile.

34. The wireless device according to claim 20, wherein the wireless device further comprises:
   a program for accessing each coupling range profile, scanning elements of each coupling range profile, and determining a distance range.

35. A transponder comprising:
   a unique identifier;
   a receiver;
   a comparator; and
   a transmitter for transmitting the unique identifier in response to receiving at least a portion of a coupling range profile received from a wireless device, wherein the coupling range profile defines a context and a coupling range based upon the context, and wherein a transmission power of the transmitter is changeable based on the geographic location of the wireless device in relation to the transponder.

36. The transponder according to claim 35, wherein the transponder further comprises:
   an alarm for indicating that the transponder is not within a range specified in the coupling range profile.

37. The transponder according to claim 36, wherein the alarm includes at least one of an audible alert, a vibration, and a light.

38. The transponder according to claim 35, further comprising a mechanical coupling clip to securely fasten the transponder to an object.

39. The transponder according to claim 35, wherein the transmission power of the transmitter of the transponder is set by adjusting a total output power.

40. The transponder according to claim 35, wherein the transmission power of the transmitter of the transponder is set by adjusting an energy per pulse of an output signal.

41. The transponder according to claim 35, wherein the transponder further comprises:
   at least one of a satellite global positioning module and a beacon module for determining the geographic location of the transponder.

* * * * *